United States Patent [19]

Kelley

[11] Patent Number: 5,355,241

[45] Date of Patent: Oct. 11, 1994

[54] IDENTIFICATION FRIEND OR FOE DISCRIMINATOR

[76] Inventor: Clifford W. Kelley, 29414 Whitney Collins, Rancho Pales Verdes, Calif. 90274

[21] Appl. No.: 100,299

[22] Filed: Aug. 2, 1993

Related U.S. Application Data

[63] Continuation-in-part of Ser. No. 804,011, Dec. 9, 1991, abandoned.

[51] Int. Cl.$^5$ .......................................... H04B 10/00
[52] U.S. Cl. ................................. 359/170; 359/169; 342/45
[58] Field of Search ............... 359/152, 154, 155, 169, 359/170; 350/4, 28; 342/45, 53, 54

[56] References Cited

U.S. PATENT DOCUMENTS

| | | | |
|---|---|---|---|
| 3,215,842 | 11/1965 | Thomas | 359/170 |
| 3,433,960 | 3/1969 | Minott | 359/170 |
| 3,989,942 | 11/1976 | Waddoups | 359/170 |
| 4,064,434 | 12/1977 | Waksberg | 359/170 |
| 4,131,791 | 12/1975 | Lego, Jr. | 359/170 |
| 4,134,008 | 1/1979 | de Corlieu et al. | 342/45 |
| 4,218,138 | 8/1980 | Robertsson | 359/169 |
| 4,249,265 | 2/1981 | Coester | 359/170 |
| 4,361,911 | 11/1982 | Buser et al. | 359/170 |
| 4,763,361 | 8/1988 | Honeycutt et al. | 359/170 |
| 4,777,660 | 10/1988 | Gould et al. | 359/170 |
| 4,837,575 | 6/1989 | Conner, Jr. | 342/45 |
| 4,866,781 | 9/1989 | Burken et al. | 359/169 |
| 4,887,310 | 12/1989 | Meyzonnette et al. | 359/170 |
| 5,274,379 | 12/1993 | Carbonneau et al. | 359/170 |

FOREIGN PATENT DOCUMENTS 2233030  3/1989  Japan ................................ 359/170

Primary Examiner—Richard E. Chilcot, Jr.
Assistant Examiner—Rafael Bacares
Attorney, Agent, or Firm—Julius Rubinstein

[57] ABSTRACT

An IFF device comprises a beam generator for directing an unmodulated beam at a target. The target has a plurality of retro-reflectors mounted on it. These retro-reflectors have internal reflecting surfaces for reflecting the unmodulated beam penetrating the retro-reflector. A device is associated with the internal reflecting surfaces for modulating the beam at a predetermined frequency so that the reflected beam emerging from the retro-reflector is modulated at the same frequency. A tuner is positioned in the path of the reflected modulated beam and tuned to predetermined frequency, so that if the tuner receives a signal, it indicates the target is friendly.

6 Claims, 2 Drawing Sheets

IDENTIFICATION FRIEND OR FOE DISCRIMINATOR

This patent application is a continuation in part of U.S. patent application Ser. No. 07/804,011 filed Dec. 9, 1991 now abandoned.

This invention relates to an identification friend or foe discriminator (hereafter referred to as an IFF device) and more particularly to a device which can discriminate between friendly and unfriendly military units, or between different friendly units.

FEDERALLY SPONSORED RESEARCH

No part of this patent application was developed with the aid of any federally sponsored research and development.

BACKGROUND AND RELATED ART

For military purposes it is often necessary to be able to determine whether unknown or unseen objects are friendly or unfriendly, and for civilian uses it may be necessary to be able to identify unknown objects. Because of this, a great deal of research has been done to find practical economically feasible solutions to these problems. The requirements of such a device are severe because the identification device must be able to function over a wide range of temperatures and over a broad frequency range.

DESCRIPTION OF PRIOR ART

Heretofore, as exemplified by the patent to Meyzonett et al U.S. Pat. No. 4,887,310 identification devices having means for modulating a reflected laser beam have been developed. But those previously developed were very expensive and not sensitive enough because their aperture was comparatively small and in military operations a target could be missed. In addition, there were the patents to Sepp, U.S. Pat. No. 4,731,879 and Kita, (Japanese) 2-233030 A, and Lego U.S. Pat. No. 4,131,791. These patents utilize liquid crystals to modulate a reflected beam. But liquid crystals are undesirable because of their temperature limitations and decreased reflectivity in a reflecting device, and any liquid crystal placed in front of a retro-reflector as in the Sepp patent decreases its sensitivity and acceptance angles. In contrast, the retro-reflector in applicants device receives an unmodulated beam which penetrates the retroreflector and reaches an internal reflecting surface and is there modulated. In addition and in contrast to the present invention, the index of refraction of the reflecting surfaces of these patents cited above plays no part in their operation.

This invention utilizes a property of a preferably glass retroreflector device which has a much larger aperture so that the target is much easier to find. These devices have the property that any laser, electromagnetic, or sound beam or ray entering the larger more effective aperture will be reflected and emerge from the entrance/exit parallel to itself but in the opposite direction back to its source. As a consequence, these properties are, within acceptance angles, independent of the orientation of the retroreflector. Retroreflectors, therefore, find frequent applications in situations where orientation is difficult or impossible to control and where a mirror or other reflecting device would therefore be unsatisfactory.

Retroreflectors have acceptance angle limitations, but the geometry of the retroreflector is complicated so the acceptance angle limitations cannot be simply specified. For that reason, it is usually possible to choose a retroreflector orientation such that for all practical purposes the acceptance angle limitations are nonexistent. As a result, it is always possible to guarantee, by appropriate orientation of neighboring reflectors in a retroreflector array consisting of at least two retroreflectors, that part of the array will be functional even at very large angles of incidence. This is in contrast to the patent to Meyzonett U.S. Pat. No. 4,887,310, Sepp U.S. Pat. No. 4,731,879, and Kita, Japan, #2-233030. In the present invention, acceptance angle limitations can be reduced at the cost of several percentage points reduction in reflective efficiency by applying coatings such as aluminum, at rear reflecting surfaces and thereby avoiding total internal reflection failure. Acceptance angle limitations can also be reduced by using a material with a proper index of refraction so that radiation falling on an internal surface of the retroreflector is reflected back even over a grazing angle.

However, retroreflectors are not by themselves sufficient for identification purposes because the object of this invention is to be able to distinguish between friendly and unfriendly units and various kinds of friendly units. Consequently merely receiving a reflection from a retroreflector does not provide sufficient information to determine whether or not the unit the retroreflector is mounted on is friendly or unfriendly. For this reason, identification requires a pre-determined modulation of the returning beam.

Applicant's device in this embodiment, depends on the property of a retro-reflector in that it reflects the incident beam back to the source of the beam by reflecting off all three internal surfaces in the retroreflector. One of these surfaces will be in total internal reflection in which all radiation reflects from an interface going from a high to a low index of refraction. This reflection can be reduced (known as a frustrated total internal reflection) by bringing another surface with about the same index of refraction as the index of refraction of the retroreflector in close proximity to this interface defining thereby an air gap. This suggests that moving this surface toward and away from the interface changes the intensity of the reflected beam in the retroreflector accordingly.

Applicant in this instance has discovered that by placing a layer or strip of some suitable elastomeric material, such as rubber (index of refraction 1.52, see Handbook of Chemistry and Physics, 37th edition, Hodgman, Weast, Selby, page 1470 Chemical Rubber Publishing Company) which has about the same index of refraction as glass (index of refraction 1.52, see Fundamentals of Physics, third edition, Halliday, and Resnick, page 867), very close to a reflecting surface in the retroreflector where the elastomeric material is backed by a material such as a piezoelectric material which varies in size in according with the voltage applied to it and then applying an alternating voltage having a pre-determined frequency to the piezoelectric strip, the size of the piezoelectric strip will change at the frequency of the voltage applied to it. This will alter the pressure exerted by the piezoelectric strip on the elastomeric material at the same frequency, thereby squeezing the elastomeric material and changing the dimensions of the air gap (index of refraction 1, see the above citation to the Fundamentals of Physics) between the surface of the retroreflector and the elastomeric layer. These changes in the dimensions of the air gap, bounded by the facing surfaces of the retroreflector and the elastomeric material, also change the intensity of the reflected beam at the same frequency as the alternating voltage so the intensity of the reflected beam will be a function of the air gap dimension. Consequently if the frequency of the voltage applied to the piezoelectric strip is known, the frequency of the intensity variation in the reflected beam coming from the retroreflector can be compared with the frequency in the comparator for identification purposes. If the reflected beam does not have the same frequency as the frequency in the comparator, the unit is not recognized as friendly.

Although to this point an alternating voltage is described as applied to a piezoelectric strip which is a backing for an elastomeric material, a piezoelectric strip is not essential. It is understood that the pressure on a suitable material can be varied at any predetermined frequency by many means including directing pulses of air or water or some other fluid against a material to cause it to change or move in such a way as to alter the size of the air gap. For example, a solenoid, powered by an alternating voltage having a predetermined frequency such as shown in FIG. 7 can be used with a properly shaped armature to cause its armature to press against an elastomeric material to change the size of the air gap at the same frequency as the alternating voltage.

The operation of the concept of frustrated internal reflection, is exactly analogous to the quantum-mechanical phenomenon of penetrating or tunneling of a plane wave through a one dimensional rectangular barrier. This requires the beam to strike and penetrate the retroreflector whereby the intensity of the reflected beam is modulated at the internal surface of the retroreflector. It is also to be understood that the modulation of the intensity of the reflected beam inside the retroreflector can be done by other means besides using a piezoelectric strip.

What is needed therefore, and comprises an important object of this invention is to arrange an array of retroreflector devices on a friendly unit, so that a beam directed against a surface of the unit on which the retroreflector devices are mounted causes the reflected beam going back to the IFF device to be modified in a predetermined way for identification purposes.

A further object of this invention is to modify a retroreflective device so that intensity of the reflected beam will vary at a predetermined frequency in the form of pulses.

Yet another object of this invention is to provide a retroreflective device which has means for changing the frequency of the intensity of the reflected beam.

Still another object of this invention is to provide a retroreflective device wherein at least one internal surface in the retroreflector is in close proximity to a layer of elastomeric material backed by a piezoelectric strip and providing means for applying alternating voltages at a predetermined frequency to the piezoelectric strip to change the intensity of the reflected beam at the same frequency as the predetermined frequency applied to the piezoelectric strip to determine whether the reflected beam is from a friendly or unfriendly unit.

Yet another object of this invention is to provide a retroreflector mounted so a reflecting surface in the retroreflector is in close proximity to a layer of elastomeric material defining an air gap therebetween along with means for applying periodic pressure pulses at a predetermined frequency to the elastomeric material to vary the size of the air gap at the same frequency and thereby modulate the intensity of the reflected beam at the same frequency.

These and other objects of this invention will become more apparent when better understood in the light of the accompanying drawings and detailed descriptions of preferred embodiments of the invention, and specification:

DETAILED DESCRIPTION OF THE PREFERRED EMBODIMENTS OF THE INVENTION

In order to facilitate understanding of the present invention, reference will be made to the appended drawings of preferred specific embodiments of the present invention. Such drawings should not be construed as limiting the invention, which is properly set forth in the appended claims.

Figure 1:
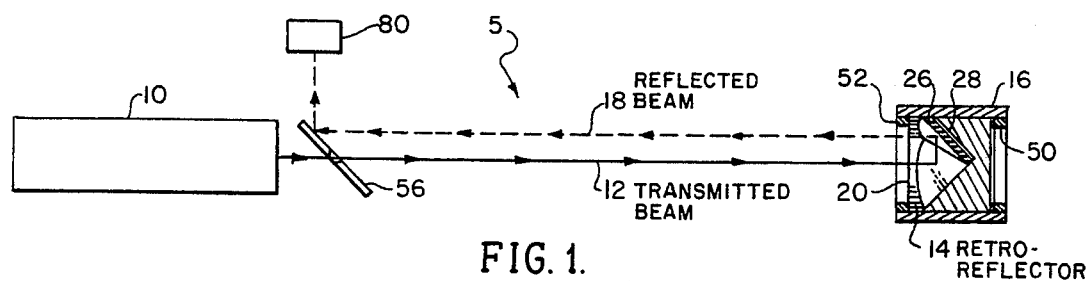
FIG. 1 is a diagrammatic representation of the full concept of the invention.
Figure 2:
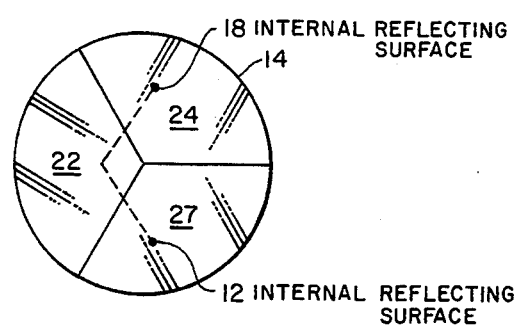
FIG. 2 is an end view of the solid glass trihedral retroreflector.

Referring now to FIG. 1, the preferred embodiment 5 comprises a laser beam transmitter indicated generally by the reference numeral 10. This transmitter, something like a flashlight, emits a laser beam 12 which is directed at an unknown target. Each retroreflector 14 is securely mounted in a housing 16 mounted on the target.

Figure 4:
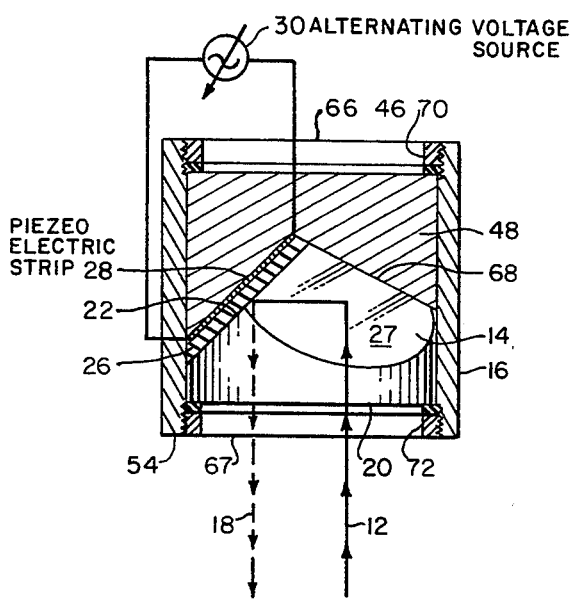
FIG. 4 is a cross-sectional view showing the mounting of the retroreflector in a housing.
Figure 5:
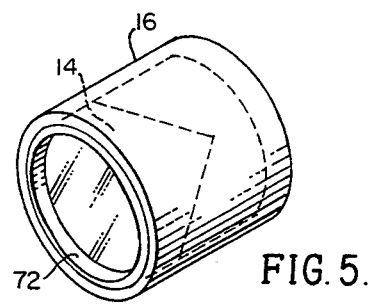
FIG. 5 is a perspective view of the housing where the retroreflector is mounted.

The retroreflectors 14 or 38 are rigidly in the housing 16 by any suitable means. Referring to FIG. 4, the rear portion 66 of the housing 16 is filled with a suitable plastic with a recess 68 sized to receive the rear portion of the glass retroreflector 14 whereby the retroreflector 14 is held in position in the housing. Cylindrical retaining rings 70 and 72 are mounted by any suitable means at ends 66 and 67 of the housing 16 to hold the retroreflector inside the housing.

Figure 3:
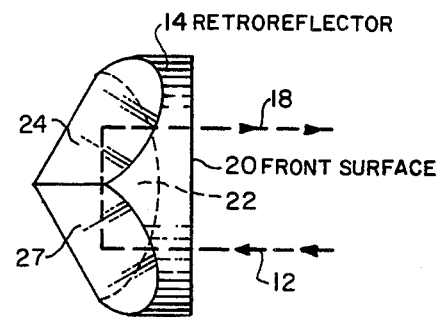
FIG. 3 is a side elevational view of the retroreflector shown in FIG. 2.

The physical characteristics of a retroreflector is that it reflects a beam 18 such as a laser beam, parallel to itself but in an opposite direction back to the laser beam transmitter. To do this, the laser beam must penetrate the front surface 20 of the retroreflector, and be reflected from the internal surfaces 27, 22 and 24 in the retroreflector before it emerges as a reflected beam 18 parallel to the incoming beam 12 and back to its source, see FIGS. 1 and 3.

To identify the target and determine whether its friendly or not, a rubber strip 26 is placed in close proximity to one of the surfaces, e.g. 22 of the retroreflector, see FIG. 4. The strip of rubber 26 is covered by a piezoelectric strip 28, see FIGS. 4 and 6. An alternating voltage source 30 is connected to the strip 28, see FIG. 4. A characteristic of piezoelectric material is that when voltage is applied to it, its dimensions change.

Figure 6:
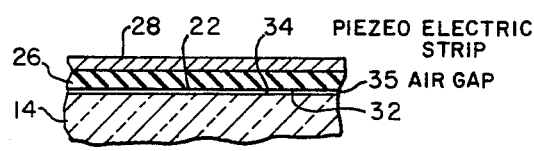
FIG. 6 is an enlarged section of a portion of the reflecting surface of a retroreflector, showing the reflecting surface backed by a layer of rubber and a piezoelectric strip.
Figure 9:
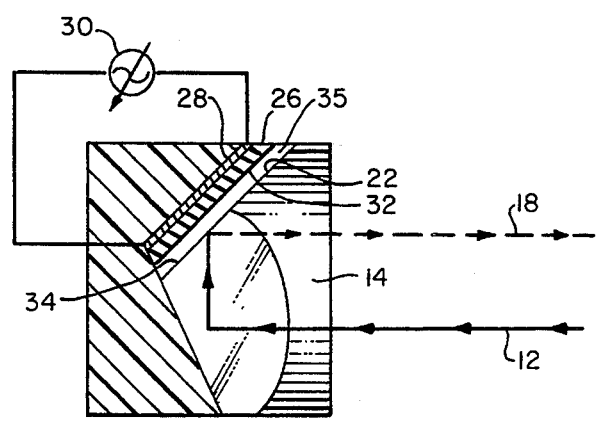
FIG. 9 is an elevational view of the glass retroreflector shown in FIGS. 1 and 2 and disclosing a rubber strip backed by a piezoelectric strip, separated from a facing surface of the glass retroreflector by an air gap which has a much lower index of refraction than glass, and showing an alternating voltage source connected to the piezoelectric strip.

Referring to FIGS. 6 and 9, the facing surface 32 of the rubber strip 26 is pressed against the facing surface 34 of the retroreflector 14 leaving an air gap 35 between the facing surface 34 of the retroreflector and the facing surface 32 of the elastomeric material. The air gap 35 is enormously enlarged in FIG. 9 for purposes of illustration but in reality it is so small, that the gap could not be seen with the naked eye.

When an alternating voltage 30 is applied to the piezoelectric strip 28, the piezoelectric strip 28 presses against the facing surface 32 of the rubber strip 26, thereby changing the dimensions of the air gap 35, in accordance with the frequency of the alternating voltage, see FIG. 9. This as shown in FIGS. 1 and 9 changes the intensity of the reflected beam 18 at the same frequency as the frequency of the alternating voltage 30 applied to the piezoelectric strip. This change in intensity in reflected beam 18 is indicated by the spaced arrows shown in FIG. 1 and the reflected beam is directed back toward the beam generator 10, see FIG. 1. The frequency of these pulses or changes in beam intensity provide a means for identifying the target.

A comparator or tuner 80, see FIG. 1, like that in U.S. Pat. No. 4,731,879 by Sepp, see Column 9 lines 15 to 22 is provided. This comparator is something like a tuner on a radio or a television set and can be tuned to a desired frequency. The comparator is positioned so it is in the path of the reflected beam 18. If the comparator or tuner is adjusted to the pre-determined frequency of the reflected modulated beam and detects the reflected modulated beam, it indicates the target is friendly. If they do not match, it =/indicates that the target is unfriendly.

A characteristic of retroreflectors used in this way, is that the distribution of the retroreflectors on the target is not critical. This means that the location of the retroreflectors and the direction of the beam does not have to be extremely precise to get a response.

IFF devices based on retroreflectors have many uses. In addition to locating the enemy, they can be used to locate the distribution of friendly units. This makes them helpful for coordinating the movement of friendly units.

To this point the retroreflector has been used above ground or above the surface of the water. Since high frequency sound travels under water, these devices, suitably modified could be used underwater, e.g. to identify friendly or unfriendly submarines, or for mine sweeping operations to locate friendly mines that have drifted away from their moorings. This requires a modification of the structure of the retroreflector.

Figure 7:
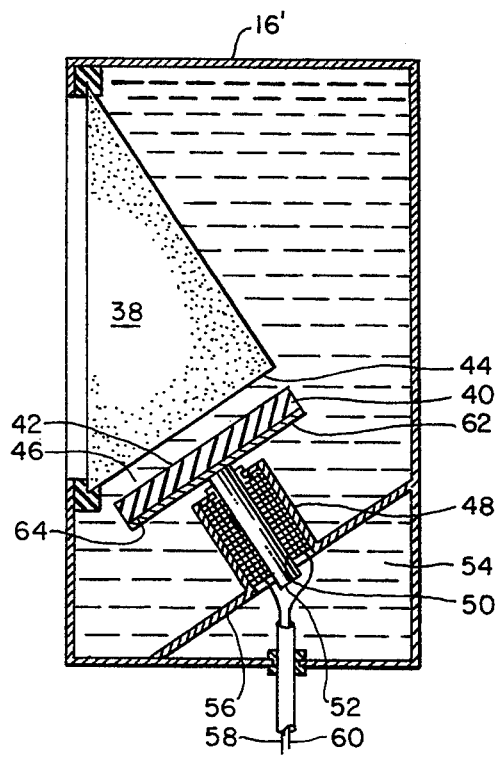
FIG. 7 is a side elevational view of a retroreflector designed for use under the water and showing a solenoid coil and plunger positioned to exert pressure on a rubber strip positioned close to a retroreflector.
Figure 8:
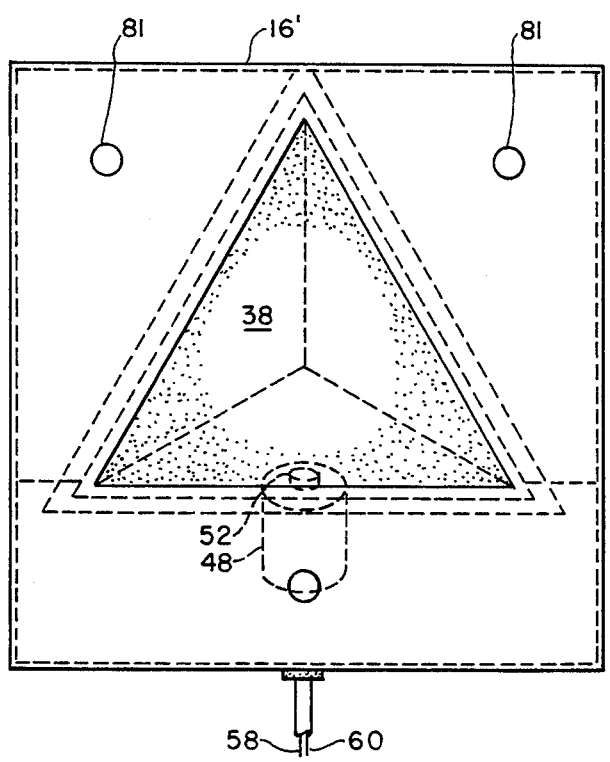
FIG. 8 is a front elevational view of the retroreflector mounted in a housing under water.

For use under water, the retroreflector 38, see FIG. 7, would be formed from a suitable sound reflecting material, such as an elastomeric material, see FIGS. 7 and 8. The shape of the elastomeric retroreflector 38 would be like the glass retroreflector 14 shown in FIG. 3 and a beam of high frequency sound would be directed against the retroreflector.

As described in connection with the glass retroreflector, to operate, the facing sound reflecting surface 42 of a rubber strip 40 must be in close proximity to a facing surface 44 of the elastomeric retroreflector 38 leaving a water gap 46 between them. In order for the water gap 46 (index of refraction 1.33, see Fundamentals of Physics, cited above) to change its dimension and thereby modulate the intensity in the beam reflected from the retroreflector, means must be provided for pressing the facing surface 42 of the rubber strip 38 against the facing surface 44 of the retroreflector 38 at a predetermined frequency. To do this, in this particular embodiment, a solenoid 48 is mounted on a bracket 56 in the housing 16'. The solenoid may be cylindrical and has an axially positioned armature receiving bore 50. A magnetic armature or plunger 52 is movably mounted in the bore 50. Means are provided for connecting an alternating voltage to said solenoid. The means may comprise a conventional alternating voltage power source (not shown) connected to the solenoid by electric cables 58 and 60.

As seen in FIG. 7 a metal strip 62 is secured to the surface 64 of the rubber strip 40 opposite surface 42. In this way, when an alternating electric current flows through the solenoid, the armature or plunger 52 is repeatedly forced against the metal strip 62 on the rubber strip 40 at the frequency of the alternating electric current. This forces the rubber strip 40 against surface 44 retroreflector changing the size of the water gap 46 at the same frequency as the frequency of the alternating current in the solenoid. This causes the reflected modulated sound beam to vary or be pulsed at the same frequency as the frequency of the current supplied to the solenoid.

In use the retroreflectors are mounted at various locations on a target. When the identification device is used in air, a beam, such as a laser beam, is directed against the target. The reflected beam is deflected by the one way vision mirror 78, see FIG. 1 to comparator 80 where the frequency of the pulses in the reflected beam 18 is compared with the programmed frequency in the comparator 80. If the frequencies coincide, the target is identified as friendly. Otherwise the target is unknown and presumed unfriendly.

Having described the invention, what I claim as new is:

1. An IFF device comprising a beam generating means for directing a beam at a target, at least one retro-reflecting device adapted to be mounted on a target, each retro-reflecting device having internal reflecting surfaces shaped so an unmodulated beam striking the reflecting device penetrates said retro-reflecting device and strikes the internal reflecting surfaces, means associated with said internal reflecting surfaces for modulating said beam inside said retroreflector by changing its intensity at the internal surfaces of the retroreflector at a predetermined frequency whereby the modulated beam is reflected back out of the retro-reflecting device in a direction parallel to and back toward the beam generating means, a tuner, said tuner positioned in the path of the modulated reflected beam and having means for adjusting the tuner to the predetermined frequency of the reflected beam whereby if the tuner receives the modulated signal from the reflected beam it indicates the target is friendly.

2. An IFF device comprising a beam generating means for directing a beam at a target, at least one retro-reflecting device adapted to be mounted on a target, each retro-reflecting device having internal reflecting surfaces shaped so an unmodulated beam striking the reflecting device penetrates said retro-reflecting device and strikes the internal reflecting surfaces, means associated with said internal reflecting surfaces for modulating said beam inside said retro-reflecting device by changing its intensity at a predetermined frequency whereby the modulated beam is reflected back out of the retro-reflecting device in a direction parallel to and back toward the beam generating means, said means comprising a layer of elastomeric material positioned close to one of said internal reflecting surfaces in said reflecting device and separated therefrom by a gap, a piezoelectric strip secured to the surface of the elastomeric material remote from surface facing the said internal reflecting surface, whereby when alternating voltage is applied to said piezoelectric strip the dimensions of the elastomeric material and the width of said gap change in accordance with the frequency of alternating voltage causing the width of said gap to vary at the same frequency, thereby causing changes in the intensity of the reflected beam to occur at the same frequency as the frequency of the alternating voltage, a tuner, said tuner positioned in the path of the modulated reflected beam and having means for adjusting the tuner to the predetermined frequency of the reflected beam whereby if the tuner receives the modulated signal from the reflected beam it indicates the target is friendly.

3. An IFF device comprising a beam generator for directing a beam at a target, at least one trihedral retro-reflector adapted to be mounted on a target, said trihedral retro-reflector having internal reflecting surfaces shaped so an unmodulated beam striking the trihedral retro-reflector penetrates said trihedral retro-reflector and strikes said internal reflecting surfaces, means associated with said internal reflecting surfaces for modulating said beam inside said retroreflector by changing its intensity at the internal surfaces of the retroreflector at a predetermined frequency, whereby the modulated beam is reflected out of said trihedral retro-reflector in a direction back toward the beam generator, and a tuner, said tuner positioned in the path of said reflected modulated laser beam and having means for adjusting the tuner to the frequency of the reflected modulated beam, whereby if the tuner receives the signal from the reflected intensity modulated beam, the target is friendly.

4. An IFF discriminator comprising a beam generating means for directing a beam at a target, at least one retro-reflecting device adapted to be mounted on the target, each retro-reflecting device having internal reflecting surfaces shaped so an unmodulated beam penetrating said retro-reflector strikes the internal reflecting surfaces, means external to one of said internal reflecting surface for modulating the internal reflected beam inside the retro-reflector by changing its intensity at the internal surfaces of the retroreflector at a predetermined frequency, whereby the modulated beam is reflected back out of the retro-reflector in a direction parallel to and back toward the beam generating means, a tuner, said tuner positioned in the path of the modulated reflected beam and having means for adjusting the frequency to the selected frequency controlled by the said external means, whereby if the tuner received the modulated signal from the reflected beam, it indicates the target is friendly.

5. An IFF device having a beam generating device for directing a beam at a target, at least one retro-reflecting device adapted to be mounted on a target, each retro-reflecting device formed from material having an index of refraction greater than air and having internal reflecting surfaces arranged so a beam striking the retro-reflecting devices penetrates said retro-reflecting device and strikes the internal reflecting surfaces, a material having an index of refraction close to the index of refraction of the retro-reflector positioned close to an internal reflecting surface defining an air gap, means for moving said material toward and away from the said internal reflecting surface at a predetermined frequency, causing said air gap to change in size so that when the said beam absorbing material moves away from said internal reflecting surface said material frustrates the intensity of the reflected beam as the size of the air gap increases, whereby the frequency of the change in the intensity of the reflected beam varies at the same frequency as the said predetermined frequency, a tuner, said tuner positioned in the path of modulated reflected beam, means for tuning said tuner to the frequency of the modulated reflected beam, whereby if the tuner receives the modulated signal the target is friendly.

6. An IFF device comprising a beam generating means for directing a beam at a target, at least one retro-reflecting device adapted to be mounted on a target, each retro-reflecting device having internal reflecting surfaces shaped so an unmodulated beam striking the reflecting device penetrates said retro-reflecting device and strikes the internal reflecting surfaces, a layer of elastomeric material positioned close to one of said internal reflecting surfaces in said reflecting device and separated therefrom by an air gap, means for causing said elastomeric material to vibrate at a predetermined frequency whereby the dimensions of the elastomeric material vary in accordance with the frequency of alternating voltage causing the width of said air gap to vary the same way thereby causing changes in the intensity of the reflected beam to occur inside the retro-reflecting device at the internal surfaces of the retroreflector at the same frequency as the said predetermined frequency, a tuner, said tuner positioned in the path of the modulated reflected beam and having means for adjusting the tuner to the predetermined frequency of the reflected beam whereby if the tuner receives the modulated signal from the reflected beam it indicates the target is friendly.

* * * * *